UNITED STATES PATENT OFFICE 2,172,612

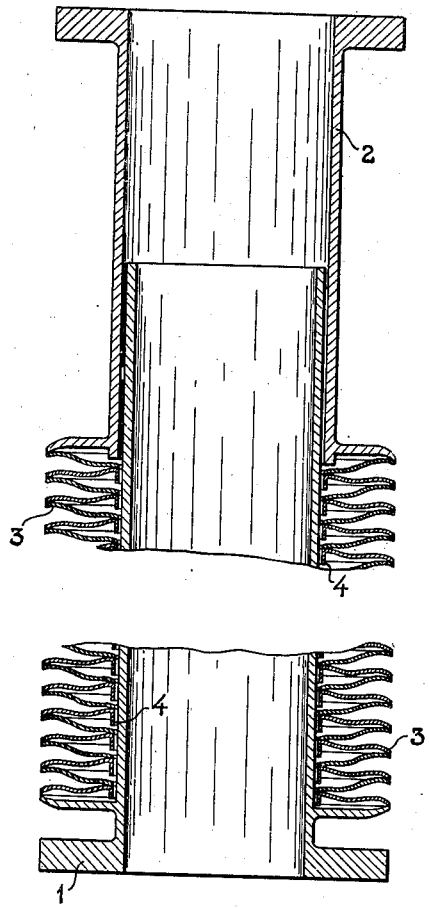

EXPANSION PIPE

Karl Mathias Hassenkamm, Copenhagen, Denmark

Application January 31, 1938, Serial No. 187,785
In Denmark February 19, 1937

1 Claim. (Cl. 285—90)

My invention relates to expansion pipes of the kind used to compensate for expansion and contraction in pipe lines carrying warm media owing to the different temperatures ruling in the pipe line, and more particularly to expansion pipes consisting of two pipes interconnected by means of a bellows-like plurality of annular units.

The objects of my invention are first to prevent, that a compression of the expansion pipe is taken up mainly by the weaker ones of the annular units, whereby these units would be overstressed and subject to fractures, as the annular units are constantly exposed to varying loads; and second to attain the desired equal distribution of the compression to all the annular units by simple and cheap means, which do not appreciably increase the weight of the corrugated expansion pipe.

It is customary to build such corrugated expansion pipes in such a manner that the annular units consist of generally conical plate rings connected alternately along their outer and inner peripheries. The objects of the invention are accomplished by combining with expansion pipes of this type, stops connected to every second plate ring at its inner periphery and extending in axial direction to contact neighboring units when the pipe is compressed. The stops may be produced in the shape of a flange along the inner periphery of every other plate. Such a flange can easily be formed at the same time as the plate is stamped.

One embodiment of the invention is illustratively exemplified in the accompanying drawing, the single figure of which shows a corrugated expansion pipe in axial section.

In the construction shown in the drawing, the corrugated expansion pipe consists of two pipe parts 1 and 2, which in a manner known per se are interconnected by a bellows-like plurality of annular units 3. These annular units are made from plate rings welded together alternately along their outer and inner periphery.

According to the invention, a flange 4 serving as a stop is provided on every second plate and adapted to cooperate with the pipe section 1, so that the latter will function as a guide for the flanges and prevent the same from getting off axial center.

Instead of a flange running along the entire periphery, there may be used bent flaps, pins welded into position or pieces of plate, or similar members acting as stops.

When the corrugated expansion pipe is compressed, because the pipe line in which it is inserted is heated, the stops 4 will have the effect that each individual annular unit can be compressed only to an extent sufficient to move two adjoining stops into full contact. By a suitable dimensioning of the stops, the annular units can thus be prevented from becoming overstressed.

I claim:

In an expansion pipe consisting of two pipe sections interconnected by means of a bellows-like plurality of annular plate units welded together alternately along their inner and outer peripheries, an axially extending integral flange on the inner edge of every second unit to contact the neighboring unit when the pipe is compressed.

KARL MATHIAS HASSENKAMM.